Oct. 12, 1965
K. SKARPAAS
3,212,036
ALL-METAL WAVEGUIDE VACUUM GATE VALVE
Filed Jan. 2, 1964
2 Sheets-Sheet 1
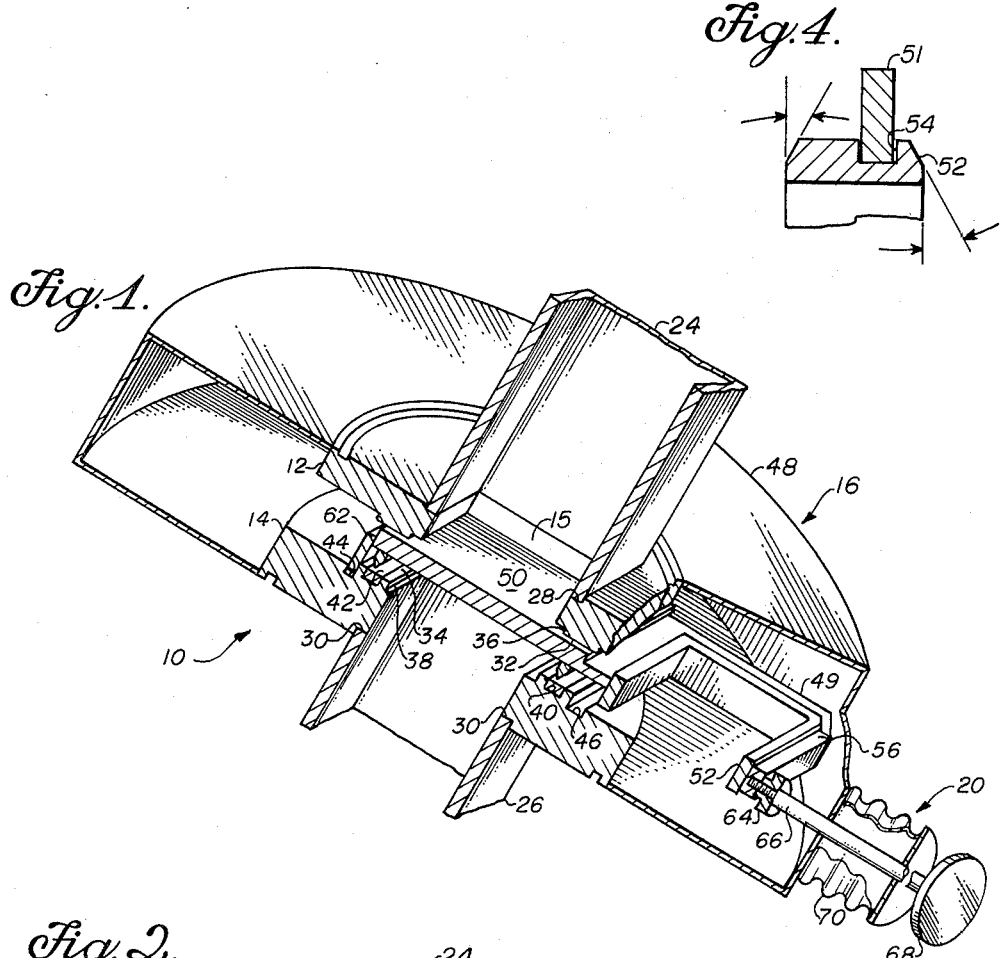
*Fig. 1.*
*Fig. 4.*
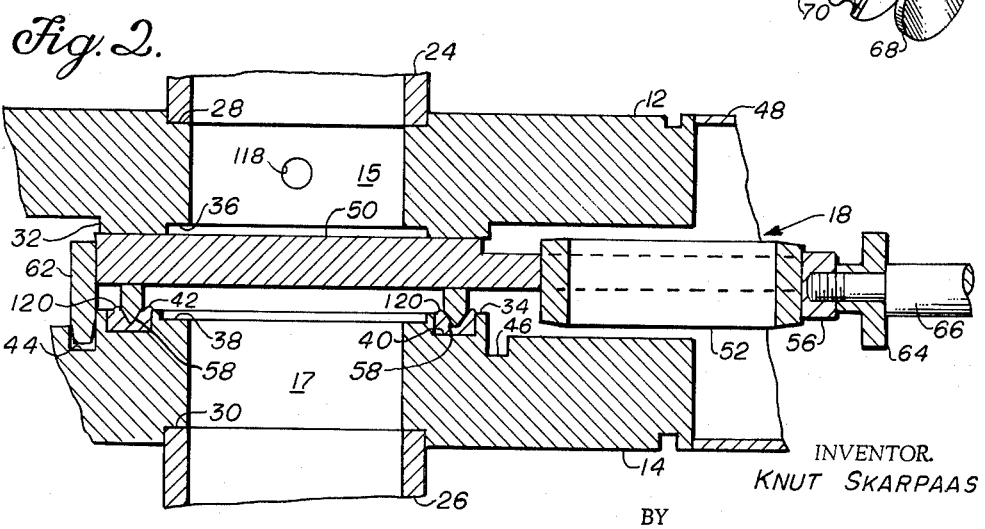
*Fig. 2.*
INVENTOR.
KNUT SKARPAAS
BY
Roland G. Anderson
ATTORNEY Oct. 12, 1965 K. SKARPAAS 3,212,036
ALL-METAL WAVEGUIDE VACUUM GATE VALVE
Filed Jan. 2, 1964 2 Sheets-Sheet 2
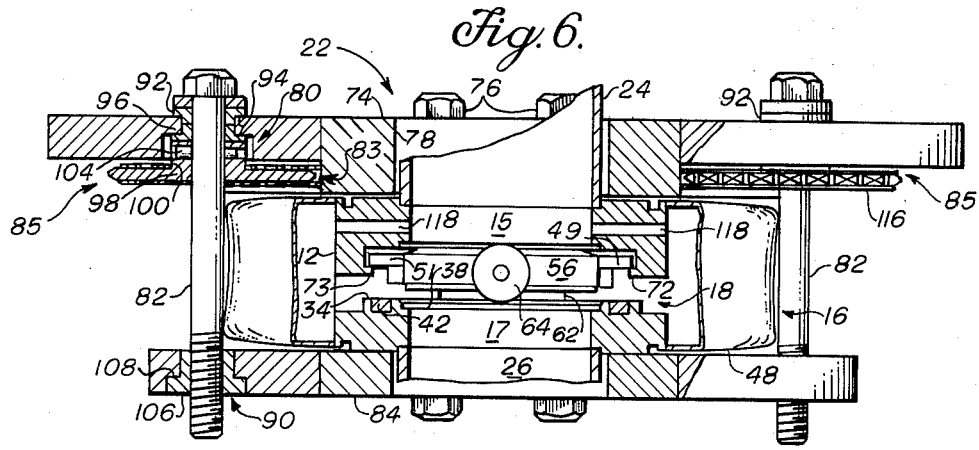
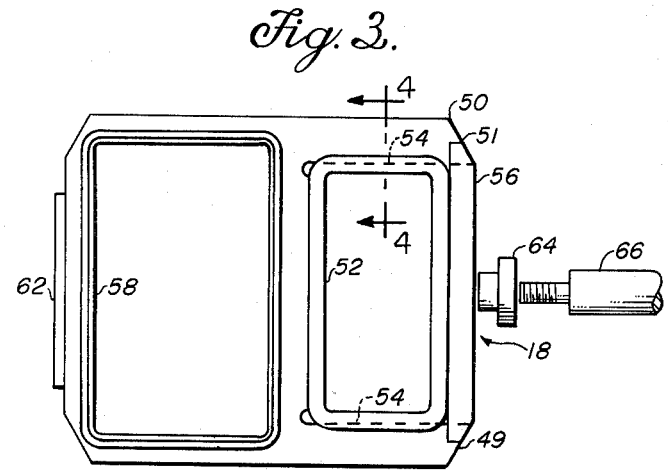
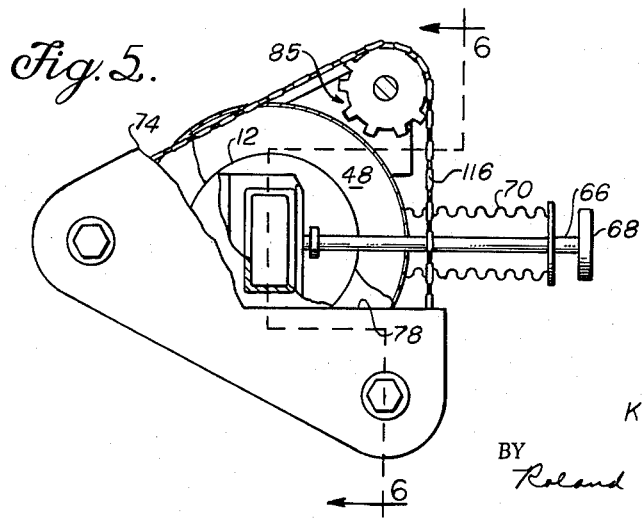
INVENTOR.
KNUT SKARPAAS
BY
*Roland G. Ludwsan*
ATTORNEY

United States Patent Office 3,212,036
Patented Oct. 12, 1965

3,212,036
ALL-METAL WAVEGUIDE VACUUM GATE VALVE
Knut Skarpaas, Palo Alto, Calif., assignor to the United States of America as represented by the United States Atomic Energy Commission
Filed Jan. 2, 1964, Ser. No. 335,448
6 Claims. (Cl. 333—98)

The present invention relates generally to waveguide vacuum valves and in particular to an in-line, very high-power, gate, waveguide vacuum valve.

Waveguides are widely utilized in transmitting radio-frequency power from sources such as klystrons to power consuming devices such as accelerators, radar antennae, etc. In many instances, such as when replacing the power source, it is desirous to provide a means, such as valve, for isolating the source from the power consuming device without suffering loss of vacuum in the system. In addition to maintaining a vacuum tight seal when closed, the waveguide valve must possess good high power-radio-frequency transmission characteristics when open. That is, when open, the valve must allow high power transmission therethrough with a minimum generation of radio-frequency arcing and field perturbation in the region of the waveguide valve seal. There are presently available, various waveguide valves which exhibit good vacuum sealing characteristics but which, however, tend to exhibit poor high power transmission characteristics. On the other hand, there are various waveguide valves available which exhibit good radio-frequency transmission characteristics but generally have poor vacuum sealing characteristics.

Accordingly, it is an object of the present invention to provide a high power waveguide vacuum valve which exhibits not only good vacuum sealing characteristics but also optimum high power radio-frequency transmission characteristics.

It is another object of the present invention to provide an in-line waveguide vacuum valve which, when open, exhibits negligible radio-frequency arcing and electromagnetic field perturbation.

It is still another object of the present invention to provide an in-line waveguide vacuum valve which, when open, provides an uninterrupted, smooth extension of the inner walls of the abutting waveguides.

Additional objects and advantages will become apparent from the following description and claims taken in conjunction with the accompanying drawings, in which:

FIGURE 1 is a perspective cross section view, showing a partially broken out portion, depicting the sealing mechanism of the waveguide vacuum valve of the present invention;

FIGURE 2 is an enlarged, partial cross section view of the sealing mechanism of the device of FIG. 1;

FIGURE 3 is an enlarged bottom view of the gate assembly utilized in the sealing mechanism and shown in FIG. 2;

FIGURE 4 is a cross section view taken along line 4—4 of FIG. 3;

FIGURE 5 is a top view of the valve of the invention showing the preferred triangular construction of the flange actuator assembly; and FIGURE 6 is a cross section view of the valve of the present invention taken generally along the line 6—6 of FIG. 5, but showing in addition an end view of the gate assembly as seen from the handle end.

Referring to FIG. 1, there is shown one embodiment of a waveguide vacuum valve 10 employing the mechanism of the present invention, which preferably includes a substantially circular guide flange 12 and gasket flange 14 disposed in facing, opposed, spacial relation with provision for relative axial movement. The flanges 12, 14 have centrally disposed, rectangular apertures 15, 17 respectively formed therein. A suitable vacuum retaining enclosure, for example, a thin-walled flexible can (annular housing or enclosure) 16, which has a centrally extending opening formed in both radially extending sidewalls thereof, is sealed as by welding to the outer circumferences of the flanges 12, 14 to provide sealed axial movement thereof. A slideable gate closure assembly 18 to disposed between the facing flanges 12, 14 and is adapted to reciprocate in a direction perpendicular to the direction of reciprocal motion of the flanges 12, 14. A gate actuating assembly 20 is secured to one end of the slidable gate assembly 18 and extends therefrom through the outer curved wall of the flexible can 16 in sealed vacuum tight relation permitting recirpocating actuation thereof. A flange actuator assembly 22 (FIG. 6) is secured to the outer flat surfaces of the flanges 12, 14 and operates to selectably urge the opposing flanges in an axial direction alternately towards and away from each other to thereby vary the inter-flange spacing.

In operation the valve 10 is inserted into a waveguide system in in-line relation therewith, and as particularly exemplified in the drawing, between lengths of rectangular waveguides 24 and 26. To facilitate securing the flanges to their respective waveguides, continuous recesses or notches 28 and 30, having dimensions matching the external dimensions of the waveguides 24, 26 respectively, are machined into the outer surface of flanges 12, 14 immediately about the apertures 15, 17 respectively. An effective vacuum tight connection is made between the waveguides 24, 26 and notches 28, 30 respectively by welding or brazing same together. Care should be taken to obtain as smooth a transition as possible between the inner surfaces of the waveguide 24, 26 and the coextensive surfaces of the apertures 15, 17, to provide a minimum of surface interruption therebetween, and thus prevent the production of radio-frequency arcing and/or field perturbation inherently associated with irregularities within a waveguide. It is to be understood that although the waveguides 24, 26 of the general waveguide system are herein integrally secured to the flanges 12, 14, provision may be made whereby the waveguides 24, 26 comprise short lengths of waveguides, which in turn have a second set of flanges mounted to the ends thereof to provide for mating with and demountably securing, as by means of bolts, to flanges in the general waveguide system.

Continuous raised strips 32, 34 are formed on the facing inside surfaces of the flanges 12, 14 and generally about the apertures 15, 17 respectively. A continuous groove 40 is cut into the raised strip 34 of gasket flange 14 along the entire length of the strip. The continuous groove 40 is filled with a gasket material such as indium metal to provide thus a relatively soft and deformable continuous gasket 42, against which a vacuum-tight seal can be established. The gasket 42 is disposed in facing relation substantially coextensive to the raised strip 32 on guide flange 12. Continuous recesses 36 and 38 are formed about the apertures 15, 17 and facing surfaces of the flanges 12, 14 respectively similar to the manner of the formation of notches 28, 30. A first and second lock groove 44 and 46 respectively are formed in the facing surface of the gasket flange 14 immediately adjacent the stepped surfaces of the longer portions of the raised strip 34.

In greater detail, the vacuum enclosure assembly 16 of previous mention comprises a thin-walled flexible can 48 having a central opening through both radially extending walls thereof. The can 48 is disposed circumjacent the flanges 12, 14, and the inner circumferences of the central openings therethrough are secured in sealed relation to the circumferential extremities of the flanges 12, 14, by brazing or welding the end walls of the can 48 thereto. The end walls of the can 48 are made flexible enough to allow the integrally attached flanges 12, 14 to reciprocate towards and away from one another in axial relation. Although the vacuum enclosure assembly 16 is herein shown as a thin-walled can 48 it is to be understood that any other flexible enclosure means which suitably fulfills the function of can 48 may be utilized. For example the radially extending walls of the can 48 may be of non-flexible material, i.e., thin steel plates which are connected together at their outer circumference by means of a flexible bellows arrangement, whereby axial motion of one flange in relation to the other flange is permitted. However, one of the main functions demanded of the flexible can as well as any other flexible enclosure means is to provide alignment between the guide and gasket flanges 12, 14. Therefore, the bellows enclosure means would require the addition of a suitable alignment system, e.g., a series of telescoping or slidable alignment rods extending axially along the outer circumference thereof, or the like.

Referring to FIGS. 1, 2, 3, and 6 there is shown in greater detail the slidable gate assembly 18 of previous mention. The assembly 18 utilizes a plate 50 having a flat surface on one side and a stepped surface on the other side, to define a relatively thick portion along substantially half the length thereof, and a thin portion along the remainder of its length. The relatively thinner portion of plate 50 has an opening machined therein to define at either side of the opening, extended arms 49 and 51. A short length of waveguide 52 with inside dimensions identical to the inside dimensions of the waveguides 24, 26, is disposed generally within the opening formed in the steel plate 50 and is secured between arms 49, and 51. More particularly, the shorter portions of waveguide 52 are machined to form slots 54 (see FIG. 4) along the outer surfaces thereof, whereby the waveguide 52 may be slidably fitted to the extended arms 49, 51. A waveguide-securing strip 56 is attached at either end thereof to the ends of arms 49, 51 by any suitable means such as by welding or brazing. The strip 56 bears against and thus secures waveguide 52 to plate 50 in integral relation.

A continuous knife edge 58, of generally rectangular shape, is situated upon the flat side of the thicker portion of plate 50 and is secured thereto by means of welding or brazing. It should be noted that the combined cross section thickness of the assembled plate 50 and knife edge 58 should be equal to the thickness (or axial length of the short length of waveguide 52, while the surface of the stepped portion of the plate 50 should lie substantially along a plane extending across the upper annular seal surface of waveguide 52, as particularly shown in FIG. 2. A gate assembly lock member 62 formed, for example, of a steel strip, is rigidly secured in perpendicular relation to the thicker portion of the plate 50 opposite the end wherein is secured waveguide 52. Lock member 62 is of sufficient width to extend in an axial direction beyond the continuous tip of knife edge 58. By so extending, lock member 62 can mate with the lock groove 44 on flange 14 at such time as the valve is "closed," i.e., when the knife-edge 58 is in register with apertures 15, 17. An additional lock member 64 of generally circular shape is rigidly secured to the waveguide-securing strip 56, and is also positioned to allow at least a portion thereof to extend beyond the edge of waveguide 52 an amount substantially equal to the extended distance of lock member 62, whereby member 64 engages and mates with the lock groove 46 in flange 14 at such time as the valve is "opened," i.e., when the waveguide 52 is in register with the apertures 15, 17. As may be seen in FIG. 2, the engaging portions of lock members 62 and 64 are beveled at the corners thereof to provide a partial self-alignment action at such time as they are mated with their associated lock grooves 44, 46 respectively.

Considering now in detail the slide actuator assembly 20, a rod 66 is threadably secured thereto, and in particular is secured to the lock member 64 and strip 56. The opposite end of rod 66 extends from the plate 50 to protrude generally radially a substantial distance through the cylindrical outer wall of flexible can 48. A knurled knob or handle 68, suitable for grasping by hand, is secured to the extremity of rod 66. A bellows 70, or other suitably expansible means, is coaxially secured circumjacent the rod 66; at one end to the cylindrical wall of the can 48 and at the other end to rod 66 in vacuum tight relation therewith. Thus, motion of rod 66 and integrally connected knob 68 along the axis thereof imparts a similar motion to the slide assembly 18 whereupon the assembly 18 is reciprocated across the facing surfaces of flanges 12, 14. Accordingly, the valve 10 may be "closed" in vacuum tight relation by registering the continuous knife edge 58 against the gasket 40 and pressing the flanges 12, 14 together, or the valve may be "opened" in radio-frequency transmitting relation by registering waveguide 52 with the facing recesses 36, 38 and compressing the flanges 12, 14 together to tightly confine the waveguide therebetween.

Consider in greater detail the flange actuator assembly 22 as shown in FIGS. 5 and 6. A flat support plate 74 of generally triangular shape is demountably secured as by means of bolts 76 against the flange 12. An opening 78 is formed in the plate 74 and has dimensions which allow the assembly of plate 74 to flange 12 without disassembling the waveguide 24 from flange 12. A stepped-hole 80 of varied diameter is formed in each of the vertices of the triangular-shaped plate 74, a substantial distance inwardly from the tip thereof. Actuating bolts 82 are disposed in holes 80 with the heads thereof protruding a slight distance above the surface of plate 74, and with the center portion thereof extending across the cylindrical surface of the flexible can 48. The end bolts 82 are threaded, and the threaded portions thereof protrude a substantial distance beyond the outer surface of flange 14. The inside surface of plate 74 is hollowed out along portions thereof to form a recess 83 of such shape and dimensions to allow the disposition therein of a bolt-drive means 85 which provides the drive transmitting means for rotating the bolts and axially reciprocate the flanges 12, 14, and which is further described hereinafter.

A second triangular-shaped flat plate 84 is demountably secured as by means of bolts 86 to the flange 14 against the outer surface thereof. A centrally extending opening 88 is formed in the plate 84, the opening having dimensions which allow the assembly of plate 84 to flange 14 without the need for disassembling the waveguide 26 from the flange 14. A stepped-hole 90 of varied diameter is drilled through the plate 84 at each vertex thereof, as in the general configuration of plate 74. The threaded portion of the bolts 82 extends a substantial distance along, and protrudes from the stepped-holes 90 in plate 84. In order to provide an axially movable relation between flanges 12, 14 and attached plates 74, 84 respectively, at such time as activator bolts 82 are rotated, it is necessary to secure the head end of bolts 82 to plate 74 in rotatable relation thereto, and the threaded portion of bolts 82 to plate 84 in axially-movable as well as rotatable relation. To this end, means comprising variously designed and arranged bushings and pins are provided in the regions between each of the bolts 82 and the plates 74 and 84.

More particularly, there is provided a split spacer-bushing 92 with an annular groove 94 formed about the central circumference thereof. The spacer-bushing 92 is split midway along groove 94, normal to the axis thereof, for ease in assembly; the entire spacer-bushing 92 being concentrically disposed about the bolt 82 with the annular groove 94 fitted snugly about a smaller diameter, upper portion 96 of the stepped-hole 80. A toothed gear 98 having an axially-extending central hub 100 is concentrically disposed on bolt 82 and within the recess 83 of plate 74, with the abutting flat surface of the hub 100 bearing against the adjacent surface of the split spacer-bushing 92. A tapered hole 102, which is drilled and tapped through hub 100 after the gear 98 and spacer-bushing 92 are properly assembled along with bolt 82 on plate 74, receives a tapered pin 104 which locks the entire assembly snugly to plate 74 in rotatable relation thereto. As may be seen, no axial movement of the bolt 82 in relation to the plate 74 is possible since bolt 82 is axially held in place by the combined confining action of the bolt head, split spacer-bushing 92, hub 100 and pin 104, about the smaller diameter, upper portion 96.

The threaded portion of bolt 82 extends through stepped-hole 90 in plate 84, and is secured thereto in axially-translatable as well as rotatable relation by means of an internally threaded bushing 106. Bushing 106 has an annular shoulder 108 formed about the circumference thereof, the bushing 106 being oriented in such position that the shoulder 108 bears against the shoulder of the stepped-hole 90 at such time as the flanges 12, 14 are being urged together. The bushing 106 is pressed into the stepped-hole 90 to secure it firmly thereto. However, the bushing 106 could also be integrally secured to plate 84 by means of set-screws (not shown) threadably disposed in plate 84, which, when tightened would bear against the outer circumferential surface of bushing 106 to prevent movement thereof at such time as the flanges 12, 14 are being pulled apart by the actuator assembly 22. It is to be understood that although only one bolt 82, and the mounting assembly thereof to plates 74, 84 is herein particularly described, other bolts 82 which are employed for actuating the plates are mounted in substantially similar fashion.

The preferred flange actuator assembly 22 of FIGS. 5 and 6 utilizes triangularly shaped plates 74, 84 and three bolts 82 located at the vertices thereof, wherein each bolt 82 has a respective toothed gear 98, and wherein the combination of bolts, plates and gears are mounted together in the manner hereinbefore described. The bolt-drive means 85 of previous mention utilizes in its construction a series of toothed gears 98 rotatably coupled together by means of a drive chain 116 of suitable link dimensions to allow the drive chain to mesh with the teeth of the gears 98. A chain and gear arrangement is preferred since optimum results are obtained by using a positive drive system which exhibits no slippage and/or looseness of coupling between gears 98. The recess 83 of previous mention is formed by hollowing out the portions of the inside surface of plate 74 which conform to the area displaced by the gears 98 and drive chain 116 of the bolt-drive means 85; the recess 83 thus generally extending parallel along the edges of the plate 74 to define a channel for passage of the chain, and circular hollowed out portions at each vertex of the plate 74 to define generally circular recesses in which the gears are disposed.

Parallel alignment of the plates 74, 84 and attached flanges 12, 14 respectively, is possible since the chain 116 is exposed and can be mounted in place about the succession of gears 98 after all the bolts 82 are rotated to the correct position to properly align the flanges. However, if very fine adjustment of the relative attitude of the plates and flanges is required, a modified bushing (not shown) may be employed utilizing the set-screw method of securing the bushing to the plate 84. The exposed radial surface of the modified bushing is slotted to allow the rotation of one of the modified bushings in relation to the respective bolt upon loosening the respective set-screw, thereby imparting axial motion to the bolt without rotating the bolt after installation of the chain 116 about the sequence of gears 98. In a triangular, three bolt arrangement, two of such modified bushings could be utilized to allow very exact parallel alignment of the flanges 12, 14.

Although the flange actuator assembly 22 herein described utilizes a triangular shape and a 3-point bolt-drive means 85, it is to be understood that the assembly 22 could utilize an elongated, rectangular plate, which would replace the herein described plates 74, 84. The elongated plates would utilize a 2-point plate-drive means using only two bolts 82. On the other hand, the assembly 22 could use larger rectangular or square plates with a 4-point bolt-drive means using four bolts 82 disposed at the corners of the plate.

In operation, the position of the gate assembly 18 between flanges 12, 14 is changed from the "open" or radio-frequency transmitting position, to the "closed" or vacuum-tight position by first urging apart flanges 12, 14 by operating the bolt-drive meaans 85 of the actuator assembly 22. At such time as flanges 12, 14 are moved apart an effective clearance distance, slide assembly 18 will likewise be pulled away from flange 14, and in particular, lock member 64 will be pulled from its position in the lock groove 46. Thus, waveguide 52 is moved from contact with recess 38 a sufficient distance to allow the edges of the waveguide 52 to substantially clear, at either edge, both raised strips 32, 34. As shown in FIG. 6 the gate assembly 18 is slidably secured to flange 12 by under-handing slide runners 72, 73 which extend from the inner surface of the flange 12 along parallel chords of the circular configuration of the flange. To allow clearance between the gate assembly 18, i.e., waveguide 52 and the shoulder of recess 36, sufficient clearance in the axial direction must be provided between the slide runners 72, 73 and the part of flange 12 body which slides therein. At such time as the flanges 12, 14 are moved apart by means of flange actuator assembly 22, slide assembly 18 is translated along the facing surfaces of flanges 12, 14 by application of force to handle 68 and rod 66 in a direction normal to the axial length of waveguides 24, 26. The extent of travel by slide assembly 18 when closing the valve 10, is determined by the lock member 62 which bears against the side of raised strip 34 immediately above lock groove 44. In such position lock member 62 is also substantially aligned with lock groove 44, and continuous knife edge 58 is properly registered opposite the continuous gasket 42. Flange actuating assembly 22 is then operated to urge the flanges 12, 14 together whereupon the raised strip 32 bears against the relatively thick portion of plate 50 to thus drive the continuous knife edge 58 into the continuous gasket 42 to effect the desired vacuum seal of waveguide 26, see FIG. 2. A sufficient plurality of radially extending holes 118 are bored through the flange 12 to provide communication between the volume within can 48 and waveguide 24 whereby evacuation of the can 48 is permitted while the valve is in the "closed" position.

When the valve 10 is to be "opened" to the radio-frequency transmitting position, flange actuator assembly 22 is operated to pull apart flanges 12, 14 the selected distance and the gate assembly 18, and particularly knife edge 58, is withdrawn from its seal position in gasket 42. Likewise, lock member 62 is drawn from mating relation with lock groove 44, whereupon gate assembly 18 is translated across the facing surfaces of flanges 12, 14 by the application of force to handle 68 until lock member 64 bears against the side of raised strip 34 immediately above lock groove 46. Accordingly, lock member 64 is properly aligned with lock groove 46 and waveguide 52 is properly registered between the continuous recesses 36, 38' of flanges 12, 14 respectively. Flange actuator assembly 22 is thereupon operated to urge the flanges together and waveguide 52 is driven into good electrical contact relation between the coextensive recesses 36, 38.

As may be seen there are no internal projections and only very minute interruptions of the rectangular inside surfaces between waveguides 24 and 26 due to the configuration provided by the invention, thus allowing extremely efficient propagation of very high energy radio-freqeuncy power through the valve 10, and a minimum of field perturbation and radio-frequency power loss.

The waveguide vacuum valve of the invention is preferably utilized in an associated waveguide system with the axis thereof lying vertically, i.e., with waveguides 24, 26 extending generally vertically. After a succession of closures are made with the valve 10, the knife edge 58 causes sufficient deformation of the indium gasket 42 (see the "lips" 120 of FIG. 2) and a subsequent possible loss of vacuum sealing property. However, with the valve "open," heat may be applied to the indium gasket to cause same to flow and reform to its initial cross section. Since indium melts at a relatively low temperature, no other parts of the valve are affected deleteriously by the application of heat. However, the valve can be utilized in the horizontal position if so desired, i.e., with the axis thereof lying in a horizontal position, until such time as the gasket 42 need be reformed. At such time the valve could be disassembled to allow orienting same with the axis parallel to the vertical, and reforming the gasket 42 with heat as described supra.

While the invention has been disclosed with respect to a specific embodiment, it will be apparent to those skilled in the art that numerous variations and modifications may be made within the spirit and scope of the invention and it is not intended to limit the invention except as defined in the following claims.

What is claimed is:

1. An in-line radio-frequency waveguide vacuum valve for use in a radio-frequency waveguide transmission system comprising;
    (a) a first annular flange having an aperture therethrough;
    (b) a second annular flange having an aperture therethrough and disposed in coaxial facing spaced-apart relation to said first flange;
    (c) flexible vacuum enclosure means secured in sealed circumjacent relation to the outer circumferences of said spatially opposed flanges;
    (d) continuous gasket means formed about the aperture in said second flange on the surface thereof facing said first flange;
    (e) gate means including a closure plate and integrally secured continuous vacuum-edge-seal said gate means disposed to demountably register said edge in sealed relation against the continuous gasket means of said second flange;
    (f) a short waveguide section integrally secured to said gate means in contiguous relation to said vacuum-edge-seal and disposed to demountably register in sealed coextensive relation between the apertures of said first and second flanges, said gate means and waveguide section defining a reciprocable slide assembly;
    (g) flange actuator means coupled to said flanges to selectably urge the opposed flanges alternatively towards and away from each other and thereby vary the inter-flange space, whereupon increasing said inter-flange space affords selectably reciprocating said slide assembly between said flanges, and decreasing said inter-flange space clamps and seals a selected portion of said slide assembly therebetween in register with said apertures.

2. The radio-frequency waveguide vacuum valve according to claim 1 wherein said flexible enclosure means comprises a thin-walled cylindrical can having a central opening through the radially extending sidewalls thereof, said can being disposed circumjacent about said opposed flanges with the inner circumferences of said sidewalls secured in vacuum sealed relation to the circumferential extremities of said first and second opposed flanges.

3. The radio-frequency waveguide vacuum valve according to claim 1 wherein said closure plate is generally rectangular in shape and is disposed in parallel relation between the facing surfaces of said first and second flanges, said continuous vacuum edge-seal comprises a knife-edge integrally secured to the surface of said rectangular plate facing said second flange, wherein the combined thickness of the knife-edge and plate is substantially equal to the axially extending length of the short waveguide section.

4. The radio-frequency waveguide vacuum valve according to claim 1 wherein said flange actuator means further comprises rigid support members secured to said flanges and having portions thereof extending in part beyond the periphery of said flanges, and drive means including a plurality of bolts coupled between the extended portions of said rigid support members to urge the opposed flanges alternately towards and away from each other.

5. The radio-frequency waveguide vacuum valve according to claim 4 wherein said rigid members further comprise a first and second plate secured to said first and second flange respectively, and said drive means comprises a plurality of bolts each secured at one end to said first plate in rotatable relation thereto, the other end of each of said bolts being secured to said second plate in rotatable as well as translatable relation thereto, means secured to said plurality of bolts to rotatably couple said bolts together in synchronous rotation wherein rotation of one bolt imparts an identical rotation to the remaining bolts.

6. The radio-frequency waveguide vacuum valve according to claim 5 wherein each of said plates has a plurality of coextensive stepped-holes formed in the extended portions thereof, said drive means comprises a plurality of bolts having threaded end portions and disposed through respective stepped-holes in said first plate and which extend therefrom along the threaded end portions thereof through respective stepped-holes in said second plate, a plurality of lock-bushings demountably secured about the smaller diameter portions of said stepped-holes in said first plate, toothed gear means concentrically secured to each of said bolts in tightly abutting relation to said lock-bushings the combination of said gear means and lock-bushings coacting to prevent axial translation of said bolts in relation to said first plate, bushing means having an internally threaded bore therethrough secured within each of said stepped-holes of said second plate, said threads of said threaded bores mating with respective threaded end portions of said bolts, chain means disposed in meshing relation about the plurality of toothed gear means whereupon rotation of one bolt through a preselected angle imparts an identical angle of rotation to the remaining chain-coupled bolts whereby said bolt rotation imparts an even axial translation of said second plate in relation to said first plate.

No references cited.

HERMAN KARL SAALBACH, *Primary Examiner.*